Sept. 9, 1941.　　　F. DE L. BROWN　　　2,255,347
AUTOMOTIVE DEVICE
Filed May 16, 1939　　　4 Sheets-Sheet 4
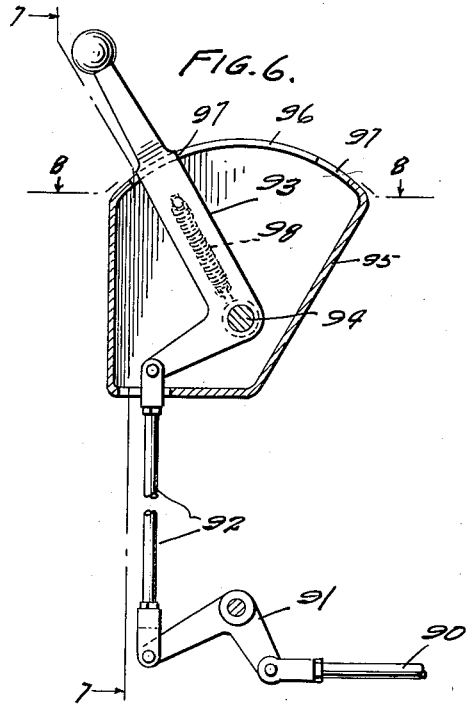
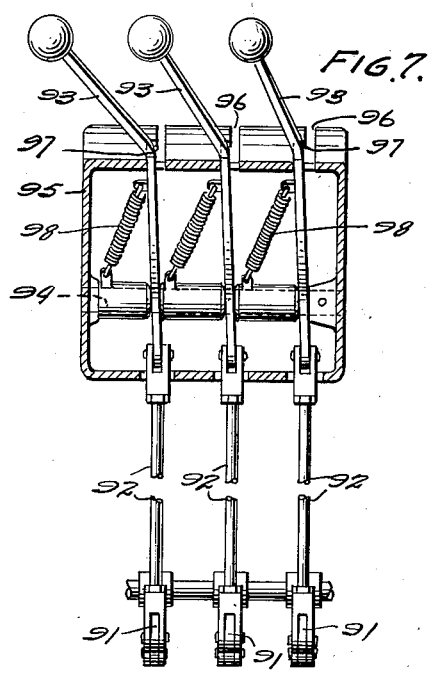
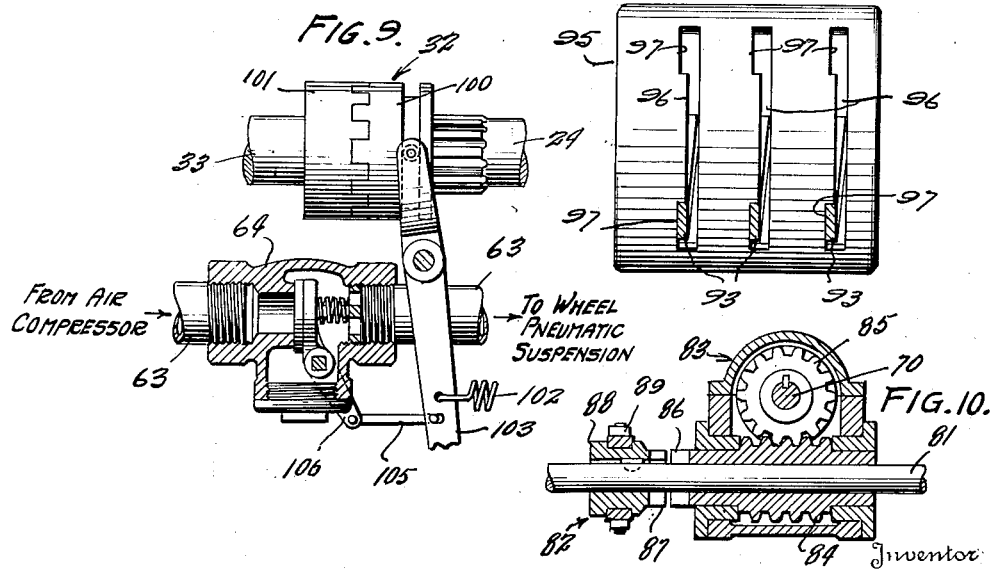
Inventor
FLOYD deL. BROWN
By Semmes, Keegin & Semmes
Attorneys Patented Sept. 9, 1941

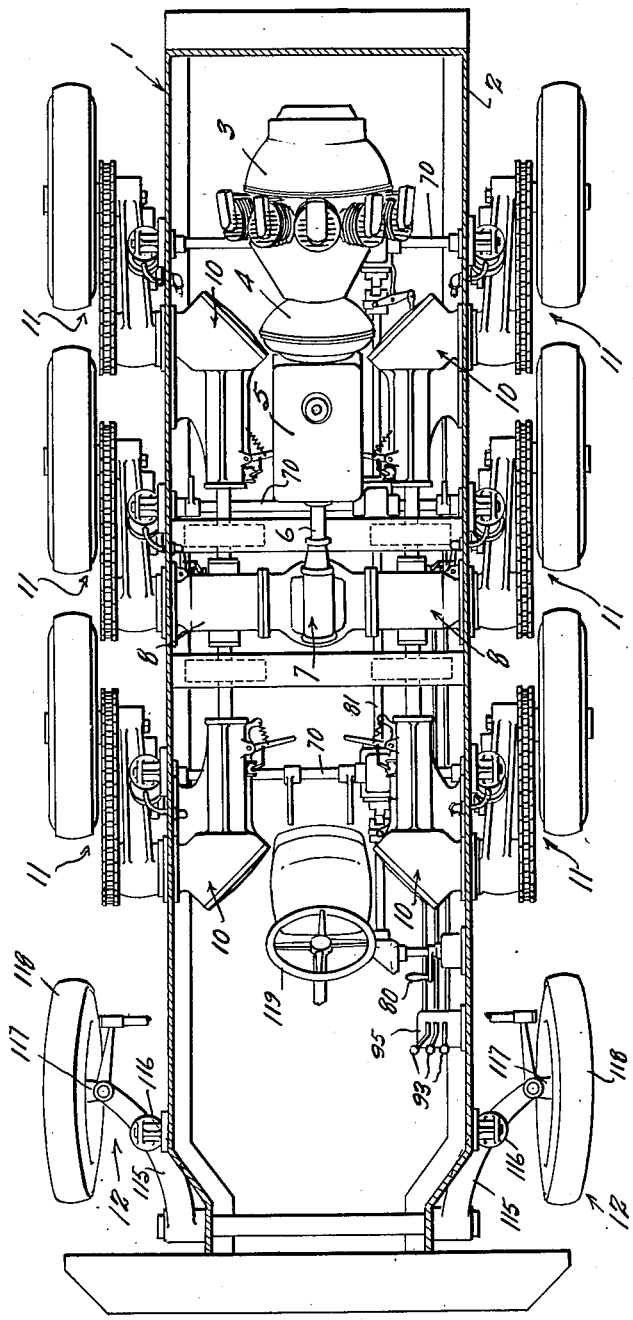

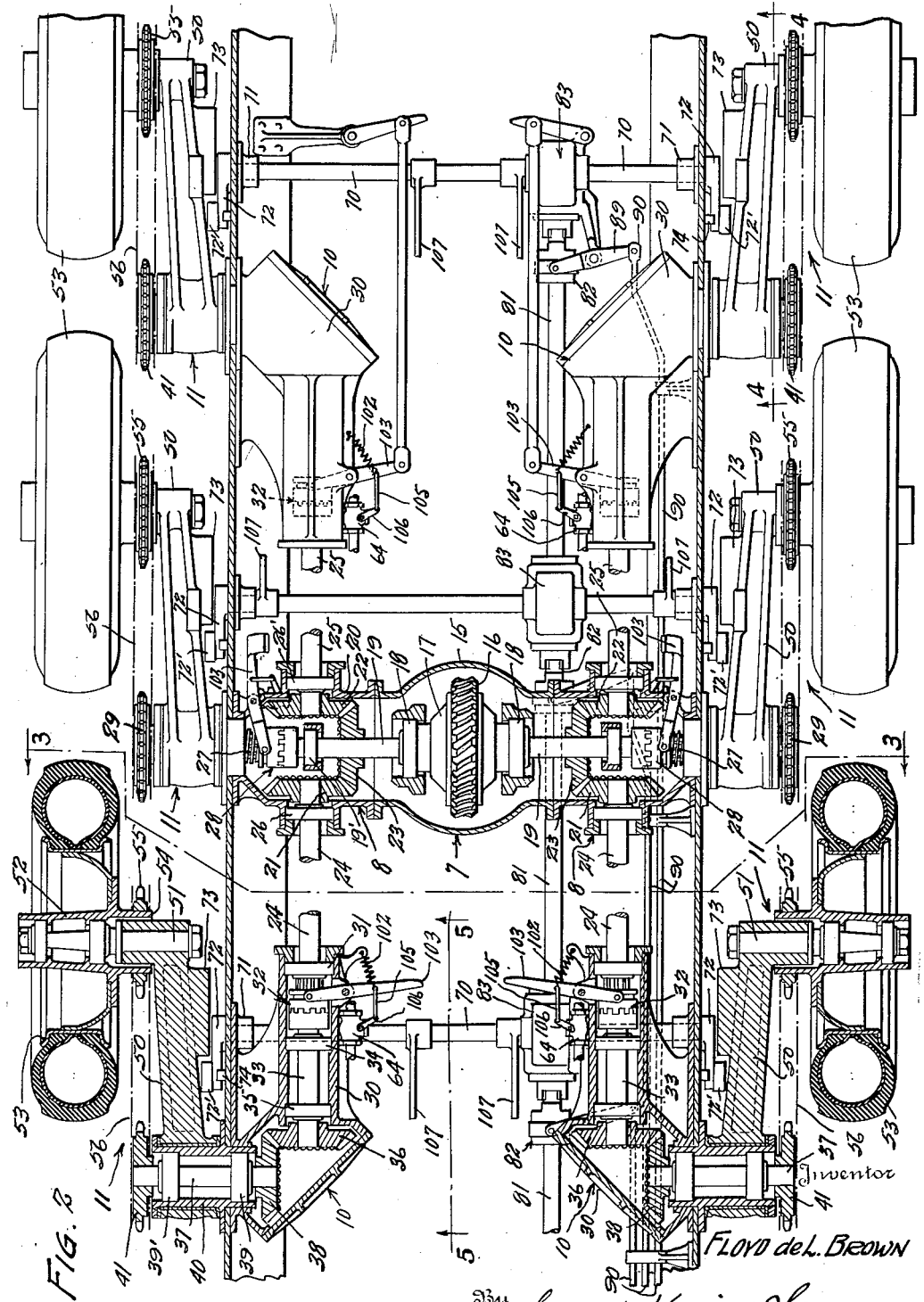

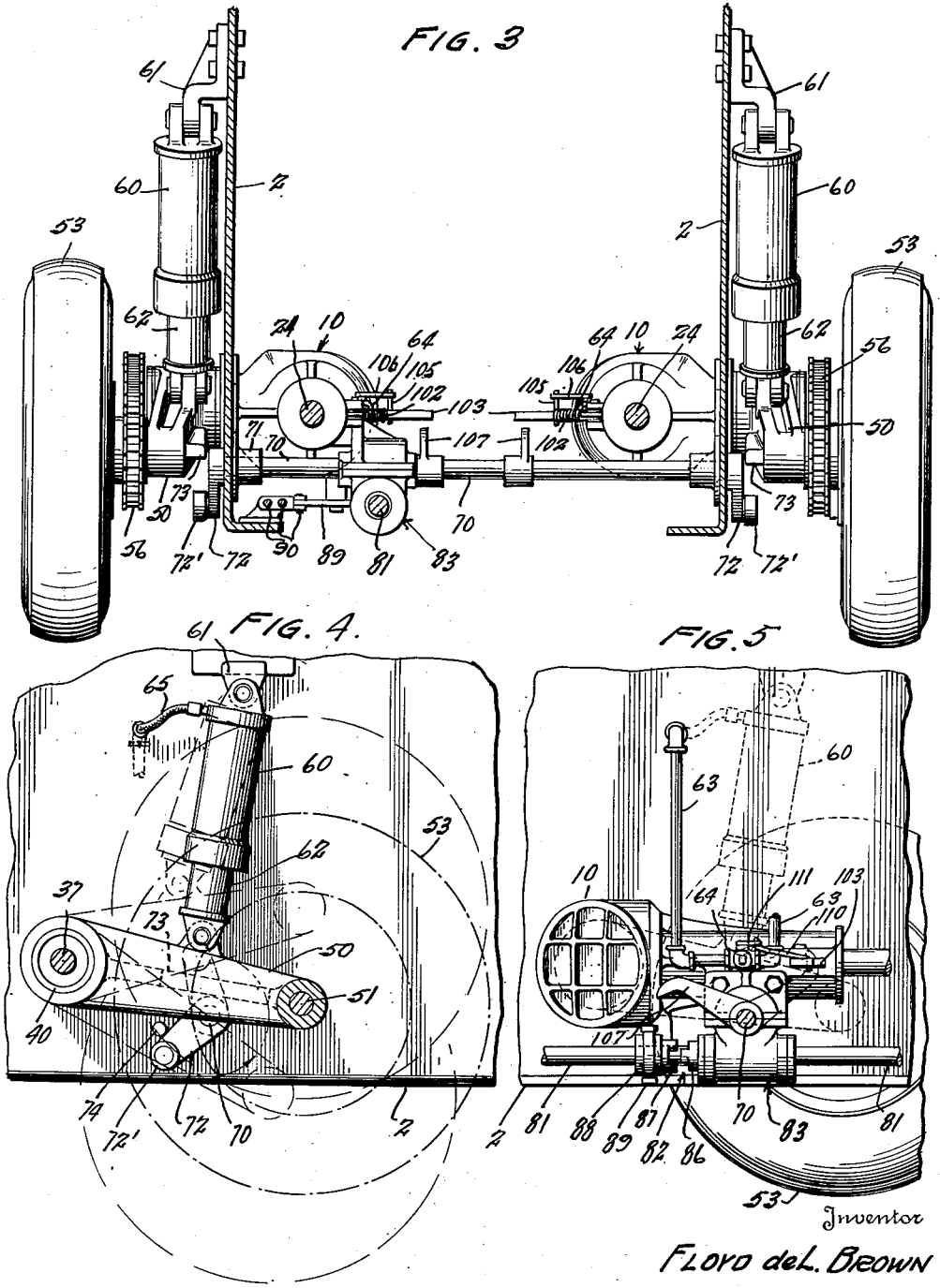

2,255,347

UNITED STATES PATENT OFFICE 2,255,347

AUTOMOTIVE DEVICE

Floyd de L. Brown, New York, N. Y.

Application May 16, 1939, Serial No. 274,027

21 Claims. (Cl. 180—1)

This invention relates to a mobile unit supported by a plurality of wheel assemblies, and more especially to a retraction mechanism for raising one or more selected pairs of the wheel assemblies without interfering with the operation of the vehicle.

One of the objects of my invention is to provide a mobile unit provided with one or more pairs of freely suspended drive wheel assemblies which are driven directly through a single drive mechanism.

Another object of my invention is to provide a retraction mechanism for a mobile unit of the type described, by means of which any selected opposed pair of wheel assemblies may be raised from contact with the ground.

Still another object of my invention is to provide a retraction mechanism which is constructed in such a manner that any selected opposed pair of wheel assemblies may be raised without interfering with the operation of the vehicle.

Yet another object of my invention is to provide a retraction mechanism which is so constructed that the wheel assemblies selected for raising are disconnected from the driving mechanism while the selected wheels are being raised.

A further object of my invention is to provide a mobile unit having one or more pairs of freely suspended driving wheel assemblies, each of which support a portion of the weight of the vehicle against the tension of a compression unit, said mobile unit being provided with a retraction mechanism which automatically reduces the tension of the compression unit when the selected wheels are being raised from the ground.

With these and other objects in view, my invention embraces generally the concept of providing a mobile unit having two or more pairs of drive wheel assemblies. In addition to being connected directly to the drive mechanism of the mobile unit, each of the wheel assemblies is freely suspended and supports a portion of the weight of the vehicle against the tension of a compression unit. The retracted mechanism consists of means by which any selected pair or pairs of wheels may be raised from contact with the ground. Means are also provided whereby the tension of the compression unit is reduced and the selected wheel assemblies are automatically disconnected from the main drive means while the selected wheels are being raised. The selected wheels may be raised without interfering with the operation of the mobile unit.

By providing a retraction mechanism of the type described, by means of which a selected pair or group of the wheel assemblies may be raised from contact with the ground, a mobile unit may be constructed which is provided with the necessary number of wheels for use in traversing rough or soft terrain without interfering with the operation of the mobile unit on hard surfaced highways. In utilizing the invention, one or more pairs of the wheels are raised when the unit is being used on a hard surface and are lowered again when adverse conditions are encountered. This arrangement permits the vehicle to be used at its maximum efficiency under all conditions of travel.

Moreover, if desired, one or more pairs of the rear wheel assemblies may be selectively raised. This enables the vehicle to turn in a shorter radius, which is very advantageous under many conditions of travel. In addition, a damaged wheel may be raised for purposes of repair or to remove the wheel from contact with the ground until such time as repairs can be made.

It is believed obvious from the above disclosure that I have invented a retraction mechanism, the use of which is very advantageous on vehicles which operate under greatly varying conditions. By constructing a vehicle in the manner described and providing the retraction mechanism which forms the principal feature of this invention, the unit may be used at its maximum efficiency under all conditions of travel.

In the drawings:

Figure 1 is a plan view of the mobile unit disclosing means for raising the wheels from contact with the ground.

Figure 2 is a fragmental plan view partly in section of the unit shown in Figure 1.

Figure 3 is a view taken along line 3—3 of Figure 2, looking in the direction of the arrows.

Figure 4 is a view taken along line 4—4 of Figure 2, looking in the direction of the arrows.

Figure 5 is a view taken along line 5—5 of Figure 2, looking in the direction of the arrows.

Figure 6 is a fragmental, longitudinal section of the wheel raising selector.

Figure 7 is a view taken along line 7—7 of Figure 6, looking in the direction of the arrows.

Figure 8 is a view taken along line 8—8 of Figure 6, looking in the direction of the arrows.

Figure 9 is a detailed view partly in section disclosing the suspension pressure relief valve and the wheel driving clutch.

Figure 10 is a longitudinal, sectional view of one of the wheel raising clutches and gear.

As shown in the drawings, my invention relates to a mobile unit, generally designated by the numeral 1, which consists of a frame 2, power unit 3, a clutch 4, a transmission 5, a drive shaft 6, a differential gear 7, distribution gears 8, a plurality of wheel driving clutches, a plurality of beveled gears 10, a plurality of swingably suspended wheel assemblies 11, a plurality of wheel raising mechanisms, and a steering assembly 12. As best shown in Figure 1, the power unit 3 is mounted in the rear portion of the frame 2 and is operatively connected to the differential gear 7 by means of the clutch 4, transmission 5, and the drive shaft 6.

As shown in detail in Figure 2, the differential gear 7 consists of a housing 15 which is suspended between the distribution gear boxes 8. Mounted in the housing 15 is a ring gear 16 which is adapted to engage a worm gear, which is not shown, mounted on the drive shaft 6. The ring gear is mounted on a differential gear case 17 which is journalled in a pair of bearings 18 and imparts a torque to a pair of opposed shafts 19.

These shafts extend in opposite directions transversely across the frame 2 and are journalled in bearings 19' in the distribution gear boxes 8. As these distribution gears 8 and the drive mechanism on opposite sides of the frame 2 are identical, the main drive mechanism, for purposes of illustration, will be described for one side only, it being understood that the identical parts on the opposite side of the frame bear the same numbers.

The distribution gear 8 is provided with a housing 20 which is connected to the differential housing 15 and the frame 2. Carried within the housing 20 are a pair of beveled gears 21 and 22 which are driven by a beveled gear 23 attached to the shaft 19. The gears 21 and 22 are mounted on the extremity of a forwardly extending drive shaft 24 and a rearwardly extending drive shaft 25, respectively. These shafts 24 and 25 are journalled in bearings 26 and 26', respectively, which are carried by the housing 20.

The shaft 19 is adapted to impart torque to a shaft 27 through a clutch 28. The outer extremity of the shaft 27 carries a driving sprocket 29.

The forwardly extending shaft 24 and the rearwardly extending shaft 25 terminate in the housings 30 of the beveled gears 10. As the beveled gear boxes 10 are identical in construction, only the one connected to the forwardly extending shaft 24 will be described for purposes of illustration.

The forwardly extending drive shaft 24 is journalled in a bearing 31 which is mounted within an extension of the housing 30. The shaft 24 extends through this bearing and is operatively connected by means of a sliding clutch 32 to a shaft 33. This journalled shaft 33 is driven in bearings 34 and 35 and is provided with a beveled gear 36 which drives a short shaft 37 through a beveled gear 38.

The shaft 37 is journalled in bearings 39 and 39' carried by a tubular member 40 rigidly mounted in an aperture of the frame 2 and has affixed to its outer end a driving sprocket 41. This construction is shown in detail in Figure 2, and the previously described shaft 27 is journalled in a similar manner.

Each of the wheel assemblies 11 consists of a radial arm 50, one extremity of which is movably carried on the tubular collar 40 in such a manner that it is able to rock freely. The opposite extremity of the radial arm 50 is bored to receive a stub shaft 51 which carries a hub of any suitable design 52 on which is mounted the wheel 53. A driven sprocket 55 is rigidly mounted on the inner end of the hub 52. This sprocket 55 is driven by the sprocket 41 by means of a chain or other suitable connecting means 56.

As best shown in Figure 3, each radial arm 50 is suspended and its movement is retarded by a compression unit 60 which is carried by a bracket 61 mounted on the exterior surface of the frame 2. The unit 60 is preferably of the air cushioning type and is provided with a piston 62, the lower end of which is mounted on the radial arm 50 at a point intermediate its length.

As best shown in Figures 5 and 9, the suspension device 60 is supplied with a volume of air under compression by means of a conduit 63, a spring loaded check valve 64, and a flexible conduit 65 which connects the conduit 63 with the cylinder of the suspension element 60. When the valve is in its normal closed position, the pressure of the fluid acting upon the piston 62 tends to force the radial arm 50 downward, as indicated in Figure 4, and enables the wheel 53 to be in a position to support and furnish traction for driving the mobile unit 1.

Before opening the check valve 64 a three-way valve, which is not shown in the drawings, in the conduit 63 is closed thereby preventing further passage of compressed fluid but allowing the passage of fluid from the suspension element. When the valve is opened, fluid may flow from the suspension element 60 back through conduits 65 and 63 as the arm 50 is raised.

It is believed apparent from this description that I have provided means to furnish power to all of the drive wheels of the mobile unit 1 through a single drive mechanism. The power, after being transmitted to the differential 7 in the manner previously described, is supplied to each of the centrally located drive wheels by the shafts 19 which drive the sprockets 29 and 55 through the clutches 28 and the drive chains 56.

The driving shafts 19 also supply power through the distribution gears 8 and the beveled gears 10 to the forward and rear drive wheels. This power is transmitted by the distribution gears 8 to shafts 24 and 25, thence through clutches 32, shafts 33, beveled gears 36 and 38, shaft 37, to the sprocket 41. The power is then transmitted to the sprocket 55 by means of the chain 56.

The principal feature of this application resides in providing means whereby any one or more opposed pairs of drive wheels may be raised from contact with the ground without interfering with the operation of the vehicle. In order to make this action selective, a separate set of wheel raising assemblies is furnished for each pair of wheel assemblies. As each of these wheel raising assemblies is identical in structure, only one will be described, it being understood that the corresponding parts of the remaining assemblies will bear identical numerals.

Each of the wheel raising assemblies is provided with a shaft 70 which extends transversely across and is journalled in the frame 2 at a point approximating the static load position of the arms 50 and intermediate the ends of these arms, as indicated at 71. The shafts 70 extend through the frame 2 and the extremity of each is provided with a crank arm 72 provided with a roller 72' which is constructed in such a manner that, when it is rotated in an upward direction, it will engage a lip 73 on the radial arm 50. Continued movement in this direction will raise the arm 50 and its attached wheel 53 to their retracted position, as diagrammatically indicated in Figure 4. The movement of the arm 72 in the opposite direction is limited by a pin 74 which is mounted on the exterior of the frame 2. In this connection it will be noted that the arm 72 and the roller 72' in this lowered position will not interfere with the normal movement of the arm 50.

One or all of the shafts 70 may be actuated by means of a crank 80 which is connected by suitable gearing, not shown, to a longitudinally extending shaft 81. As best shown in Figure 10, the shaft 81 is adapted to selectively transmit torque to one or more of the shafts 70 by means of clutches 82 and worm and gear drives 83. As the shaft 81 is connected to each of the shafts 70 in an identical manner, only one of these connections will be shown for purposes of illustration.

As best shown in Figure 10, each of these worm and gear drives 83 consists of a worm 84 which is adapted normally to idle on the shaft 81. The hub of the worm 84 is provided with a clutch 86 which is adapted to engage the clutch face 87 on a collar 88 which is slidably keyed to the shaft 81. The clutch faces 86 and 87 are adapted to be engaged or disengaged manually by the operator of the vehicle to transmit power to the shaft 70 through the worm 83.

A pivoted lever 89, one end of which engages the collar 88, is activated by means of a rod 90 which extends forwardly and is operatively connected through a bell crank 91 and a vertical connecting rod 92 to a pivoted hand lever 93 journalled on a stationary shaft 94 which is secured in a casing 95. The hand lever 93 extends through a slot 96 in the upper face of the casing and may be retained in a clutch engaging or disengaging position by offset notches 97 provided in the slot 96. A suitable spring 98 is provided to rock the lever 93 laterally into the notch 97.

The driven shafts 37 of each of the wheel assemblies 11 may be disconnected from the power unit 3 by means of the operation of the clutches 28 and 32. Each clutch 32 is similarly constructed and consists of the co-acting clutch members 100 and 101 which operatively connect the shafts 24 and 33. The sliding member 100 is provided with a circumferential groove in which the forked end of an actuating lever 103, pivoted on gear box 10, engages for shifting said sliding member on the splined shaft 124. Normally, the sliding member 100 is held in contact with the member 101 by means of a spring 102 which is tensioned between the beveled gear box 10 and the lever 103.

The clutch 28 which is used in the distribution gear boxes 8 is constructed in a manner similar to that of clutch 32 except that the clutch spring is mounted on the driven shaft 27 and the movement of the lever 103 separates the keyed member 101 from the member 100 which is mounted on the shaft 19. The operation of this lever 103 disconnects the center drive wheel of the device from the drive mechanism without interfering with the driving power transmitted through beveled gear 23 to the forwardly and rearwardly extending drive shafts 24 and 25. Therefore, by this arrangement any pair of opposed wheels may be separated from the differential 7 without interfering with the driving power being transmitted to the remaining wheel assemblies.

As best shown in Figure 9, the lever 103 is also connected by means of a link 105 to an arm 106, the movement of which will release the spring loaded check valve 64. This action will permit the passage of compressed fluid through the conduits 65 and 63 from the compression unit 60 as the arm 50 is lifted by the raising mechanism.

As best shown in Figures 2, 3, and 5, each of the wheel lifting shafts 70 is provided with a pair of radial arms 107 which are fixedly mounted and adapted to move into the path of the free ends of the lever 103 when the shaft 70 is rotated. This contact will overcome the tension of the spring 102 and force the lever 103 to rotate on its pivot, thereby separating the members of the clutch to which it is attached and releasing the loaded check valve.

It is believed obvious from this description that by means of this wheel raising mechanism any selected pair or pairs of wheels may be raised or lowered as desired. During the raising operation, the drive mechanism is automatically disconnected and the fluid under pressure is shut off from the compression unit 60. In operation, if it is desired to raise a pair of wheels, the operator draws the selected lever 93 rearwardly through the slot 96, thereby raising the connecting rod 92 and forcing the crank 91 to rotate on its axis. This movement causes the rod 90 to be drawn forwardly, which results in a movement of the crank arm 89 which forces the members of the clutch 82 into engagement. This action clutches the worm 84 to the shaft 81 so that power may be transmitted to the shaft 70 through the worm gear 83.

With the lever 93 in this position, the crank 80 is rotated, thereby causing a rotation of the shaft 81. The crank 80 is rotated in such a manner as to cause a counter-clockwise rotation of the shaft 70. This movement of the shaft 70 will cause the crank roller 72' to engage the lip 73 on the radial arm 50 and cause an upward movement of the radial arm, as shown in Figure 4. As the movement of the crank arm 72 advances into contact with the lip 73, the radial arm 107 engages the lever 103 to engage the wheel clutch and release the check valve, thus disconnecting the drive to the wheel and relieving the pressure in the suspension device in the manner which has previously been described. The radial arm 50 of the selected wheel assemblies 11 can now be easily rotated by the action of the crank arm 72 against the lip 73 until the wheel assemblies 53 are raised into a position out of contact with the ground.

If it is desired to lower a pair of raised wheels, the operation of the crank 80 is reversed, thereby reversing the direction of rotation of the shaft 70. This causes the arm 72 to gradually lower the radial arm 50 to a ground engaging position. During this operation, the pressure of the radial arms 107 against the levers 103 is released, thereby permitting the spring 102 to draw the lever 103 into a position in which the members of the clutches 28 or 32 will be engaged and the check valve 64 will be closed. This action supplies the wheel assemblies with power from the main driving mechanism, and the compression in the unit 60 will again build up to permit the wheel assemblies 11 to support a proper proportion of the entire weight of the mobile unit 1.

The steering unit 12 consists of a pair of radial arms 115 pivotally connected to the frame 2 and suspended by compression devices 116 which are similar in construction to the elements 60. The free ends of the arms 115 carry the pivoted wheel axles 117 upon which are mounted wheels 118. The pivoted wheel axles are connected to steering wheel 119 in any suitable manner.

While for purposes of illustration I have shown a mobile unit which is provided with three pairs of driving wheels and a single pair of supporting wheels, it is obvious that the invention is not limited to the number of wheels employed. On the contrary, the invention embraces broadly the idea of providing a mechanism by which a single selected pair of wheels or more than one pair of wheels may be raised from contact with the ground without interfering with the operation of the mobile unit or the wheels which are left in contact with the ground. Moreover, although only one mechanical means for accomplishing this result is shown, it is obvious that various mechanical equivalents may be employed for raising the wheels and disconnecting the wheel assembly from the drive mechanism without departing from the concept of this invention.

I, therefore, wish it understood that this invention is not limited to the specific embodiment disclosed in the drawings for purposes of illustration, and that on the contrary it is only to be limited by the prior art and the scope of the appended claims.

I claim:

1. In a motor vehicle having a chassis and a main drive mechanism, the combination of a plurality of freely suspended drive wheel assemblies, a wheel raising mechanism consisting of means to raise in relation to said chassis a selected pair of the said wheel assemblies, and means to disconnect the selected wheels from the main drive mechanism of the vehicle during the raising operation.

2. In a motor vehicle having a chassis and a main drive mechanism, the combination of a plurality of freely suspended drive wheel assemblies, a wheel raising mechanism consisting of means to raise in relation to said chassis a selected pair of the said wheel assemblies, and automatic means to disconnect the selected wheels from the main drive mechanism of the vehicle during the raising operation.

3. In a motor vehicle having a main drive mechanism, the combination of a plurality of freely suspended drive wheel assemblies, each of which support a portion of the weight of the vehicle against the tension of a compression unit, and a wheel raising mechanism for each pair of opposed wheels, said wheel raising mechanism consisting of means to raise a selected pair of wheel assemblies, and means associated with said wheel raising means to disconnect the wheels from the main drive of the vehicle and to reduce the tension of the compression unit during the raising operation.

4. In a motor vehicle having a main drive mechanism, the combination of a plurality of freely suspended drive wheel assemblies, each of which support a portion of the weight of the vehicle against the tension of a compression unit, and a wheel raising mechanism for each pair of opposed wheels, said wheel raising mechanism consisting of means to raise a selected pair of wheel assemblies, automatic means associated with said wheel raising means to disconnect the wheels from the main drive of the vehicle, and automatic means to reduce the tension of the compression unit during the raising operation.

5. In a motor vehicle having a drive mechanism, the combination of a plurality of freely suspended drive wheel assemblies, each of which support a portion of the vehicle against the tension of a compression unit, and a wheel raising mechanism for each pair of opposed drive wheels, said wheel raising mechanism consisting of means to raise any selected pair of wheels, means to engage said wheel raising mechanism with the pair of wheels selected, means to disconnect the wheels from the drive mechanism of the vehicle during raising of said wheels, and means to reduce the tension of the compression unit during raising of said wheels.

6. In a motor vehicle having a drive mechanism, the combination of a plurality of freely suspended drive wheel assemblies, each of which support a portion of the vehicle against the tension of a compression unit, and a wheel raising mechanism for each pair of opposed drive wheels, said wheel raising mechanism consisting of means to raise any selected pair of wheels, means to engage said wheel raising mechanism with the pair of wheels selected, automatic means to disconnect the wheels from the drive mechanism of the vehicle, and automatic means to reduce the tension of the compression unit, both of said last-recited means being motivated by the wheel raising mechanism during the wheel raising operation.

7. In a motor vehicle having a supporting frame and a drive mechanism, the combination of a plurality of drive wheel assemblies, each of which is freely suspended from the said frame under tension supplied by a compression unit, a rotative wheel raising mechanism for each pair of opposed wheels, and a single means adapted to motivate the wheel raising mechanisms, means mounted on the extremities of the said wheel raising mechanisms to engage the drive wheel assemblies, and means to operatively connect the selected wheel raising mechanism to the said single motivating means.

8. In a motor vehicle having a supporting frame and a drive mechanism, the combination of a plurality of drive wheel assemblies, each of which is freely suspended from the said frame under tension supplied by a compression unit, a rotative wheel raising mechanism for each pair of opposed wheels, and a single means adapted to motivate the wheel raising mechanisms, means mounted on the extremities of the said wheel raising mechanisms to engage the drive wheel assemblies, additional means centrally mounted on the wheel raising mechanisms to actuate a means adapted to disconnect the selected wheel assembly from the drive mechanism and to reduce the tension in the compression unit during the wheel raising operation, and means to operatively connect the selected wheel raising mechanism to said motivating means.

9. In a motor vehicle having a supporting frame and a drive mechanism, the combination of a plurality of drive wheels, each of which is mounted on a radial arm which is journalled on a member attached to the said frame and each of which is under a tension supplied by a compression unit, a rotative wheel raising mechanism for each pair of opposed wheels, a single means capable of rotating any of the wheel raising means when in engagement thereof, crank arms mounted on the extremities of each of the said wheel raising mechanisms to engage the radial arms of the wheel assemblies during the raising operation, and a plurality of clutches mounted on the single motivating means which are adapted to operatively engage the said means with the selected wheel raising mechanism.

10. In a motor vehicle having a frame and a drive mechanism, the combination of a plurality of freely suspended drive wheel assemblies, each of which support a portion of the vehicle against the tension of a compression unit, and a wheel raising mechanism for each pair of opposed drive wheels, said wheel raising mechanism consisting of a rotatably mounted shaft for each pair of opposed drive wheel assemblies, said shafts extending transversely across the frame, and a longitudinally extending rotative shaft, means mounted on the extremities of the said transversely extending shafts to raise the said drive wheels, means to engage the longitudinally extending shaft with a transversely extending shaft to raise the selected pair of opposed wheels, and automatic means to disconnect the wheels from the main drive mechanism and to reduce the tension of the compression unit during said wheel raising operation.

11. In a motor vehicle having a frame and a drive mechanism, the combination of a plurality of freely suspended drive wheel assemblies, each of which support a portion of the vehicle against the tension of a compression unit, and a wheel raising mechanism for each pair of opposed drive wheels, said wheel raising mechanism consisting of a rotatably mounted shaft for each pair of opposed drive wheel assemblies, said shafts extending transversely across the frame, and a longitudinally extending rotative shaft, means mounted on the extremities of the said transversely extending shafts to raise the said drive wheels, means to engage the longitudinally extending shaft with the transversely extending shaft to raise the selected pair of opposed wheels, and means mounted on the said transversely extending shaft which is adapted to disconnect the selected wheel assemblies from the drive mechanism and reduce the tension of the compression unit during the wheel raising operation.

12. In a motor vehicle having a frame and a drive mechanism, the combination of a plurality of freely suspended drive wheel assemblies, each of which supports a portion of the vehicle against the tension of a compression unit, and a wheel raising mechanism for each pair of opposed drive wheels, each of said wheel raising mechanisms consisting of a rotatably mounted shaft for each pair of opposed drive wheel assemblies, said shafts extending transversely across the frame and being provided with crank arms which are mounted on their extremities and are adapted to engage the drive wheel assemblies during the wheel raising operation, and a longitudinally extending shaft, said shaft being provided with a plurality of clutches which are designed to operatively connect the shaft to the selected wheel raising shaft, a lever for each of said clutches, said lever being adapted to throw the clutch to which it is connected in and out of engagement, and means mounted on the said transversely extending shaft which is adapted to disconnect the selected wheel assemblies from the drive mechanism and to reduce the tension of the compression unit during the said wheel raising operation.

13. In a motor vehicle having a chassis and a main drive mechanism, the combination of a plurality of freely suspended drive wheel assemblies, a wheel raising mechanism consisting of means to raise in relation to said chassis a selected pair of the said wheel assemblies, and means actuated by the wheel raising means to disconnect the selected wheels from the main drive mechanism of the vehicle during the raising operation.

14. A motor vehicle having a drive mechanism, a plurality of freely suspended drive wheel assemblies on each side of the vehicle, pneumatic suspension means for said wheel assemblies, wheel raising mechanism for each pair of opposed wheels, clutch means for coupling and decoupling each wheel to said drive mechanism, and means actuated by said wheel raising means during raising of a pair of wheels for decoupling the wheels raised from the drive mechanism and for rendering said pneumatic means ineffective.

15. A motor vehicle having a drive mechanism, a plurality of freely suspended drive wheel assemblies on each side of the vehicle, pneumatic suspension means for said wheel assemblies, wheel raising mechanism for each pair of opposed wheels, clutch means for coupling and decoupling each wheel to said drive mechanism, valves for controlling the effectiveness of said pneumatic suspension means, and means actuated by the wheel raising means during raising of a pair of wheels for decoupling the wheels raised from the drive mechanism and for operating the valves of pneumatic suspension means of the raised wheels to render said suspension means ineffective.

16. A motor vehicle having a drive mechanism, a plurality of freely suspended drive wheel assemblies on each side of the vehicle, pneumatic suspension means for said wheel assemblies, wheel raising mechanism for each pair of opposed wheels, clutch means for coupling and decoupling each wheel to said drive mechanism, valves for controlling the effectiveness of said pneumatic suspension means, actuating means for each valve, a pivotally mounted lever for actuating each clutch means, means connecting the valve actuating means of the valve of the suspension unit of each wheel assembly with the clutch means of said wheel assembly for synchronous action, and means carried by the wheel raising means for shifting the levers of the clutch means of the wheels raised to decouple said raised wheels and render the associated pneumatic suspension means ineffective.

17. In a motor vehicle of the character described, a frame, a plurality of freely suspended wheel assemblies mounted on the frame, compression units interposed between the wheel assemblies and frame, means for raising said wheel assemblies, means for controlling the tension of said compression units, and means connected to said wheel raising means for actuating the tension control means for reducing the tension of said compression units.

18. In a motor vehicle of the character described, a frame, a plurality of freely suspended wheel assemblies mounted on the frame, pneumatic compression units interposed between the wheel assemblies and frame, valve means for controlling the tension of said compression units, means for raising the wheel assemblies, means for actuating said valves, and means carried by said wheel raising means for operating the valve actuating means to reduce the tension of said units.

19. In a motor vehicle of the character described, a frame, a plurality of freely suspended wheel assemblies mounted in pairs, one on each side of the frame, compression units interposed between the wheel assemblies and frame, a wheel raising mechanism for each pair of opposed wheels, and means carried by each wheel raising mechanism for reducing the tension in the compression units during such raising.

20. In a motor vehicle of the character described, a frame, a plurality of freely suspended wheel assemblies mounted in pairs, one on each side of the frame, compression units interposed between the wheel assemblies and frame, a wheel raising mechanism for each pair of opposed wheels, means carried by each wheel raising mechanism for reducing the tension in the compression units during said raising, a single means adapted to motivate the wheel raising mechanisms, means mounted on the extremities of said wheel raising mechanisms to engage the drive wheel assemblies, and means to operatively connect the selected wheel raising mechanism to the single motivating means.

21. In a motor vehicle of the character described, a frame, a plurality of freely suspended wheel assemblies mounted in pairs, one on each side of the frame, compression units interposed between the wheel assemblies and frame, a wheel raising mechanism for each pair of opposed wheels, said wheel raising mechanism consisting of a rotatably mounted shaft for each pair of opposed wheel assemblies, said shafts extending transversely across the frame, a longitudinally extending rotative shaft, means mounted on the extremities of said transversely extending shafts to raise said wheel assemblies, means coupling the longitudinally extending shaft with the selected transversely extending shaft to raise the associated pair of wheels, means for controlling the tension of said compression units, and means carried by said transevrsely extending shafts for actuating the tension control means of the compression units of the wheel assemblies raised.

FLOYD DE L. BROWN.

CERTIFICATE OF CORRECTION.

Patent No. 2,255,347.   September 9, 1941.

FLOYD de L. BROWN.

It is hereby certified that error appears in the printed specification of the above numbered patent requiring correction as follows: Page 2, first column, line 59, for "This journalled shaft 33 is driven" read --This driven shaft 33 is journalled--; same page, second column, strike out the paragraph beginning in line 31 with "When the" and ending in line 33 with "is raised." and insert the same after "unit 1." in line 25; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.